United States Patent
Fukuoka (10) Patent No.: US 8,294,798 B2
(45) Date of Patent: Oct. 23, 2012

(54) SOLID-STATE IMAGING APPARATUS (75) Inventor: Naoto Fukuoka, Hachioji (JP)

(73) Assignee: Olympus Corporation, Tokyo (JP)

( * ) Notice: Subject to any disclaimer, the term of this patent is extended or adjusted under 35 U.S.C. 154(b) by 649 days.

(21) Appl. No.: 12/477,400

(22) Filed: Jun. 3, 2009

(65) Prior Publication Data
US 2009/0295970 A1 Dec. 3, 2009

(30) Foreign Application Priority Data

Jun. 3, 2008 (JP) ................. 2008-145583

(51) Int. Cl.
H04N 3/14 (2006.01)
H04N 5/335 (2011.01)
(52) U.S. Cl. .................. 348/300; 348/308
(58) Field of Classification Search .......... 348/294, 348/300–302, 308–310; 250/208.1
See application file for complete search history.

(56) References Cited

U.S. PATENT DOCUMENTS
2008/0036890 A1* 2/2008 Yamashita et al. ............ 348/308

FOREIGN PATENT DOCUMENTS
JP 2001-230974 A 8/2001
* cited by examiner

Primary Examiner — Alicia M Harrington
(74) Attorney, Agent, or Firm — Westerman, Hattori, Daniels & Adrian, LLP (57) ABSTRACT A solid-state imaging apparatus including a pixel section having pixels arranged into rows and columns each pixel containing at least a photoelectric conversion device for converting an incident light into signal electric charges, a transfer device for transferring the signal electric charges generated at the photoelectric conversion device, and an amplification device for amplifying the transferred signal electric charges; constant current supplies each connected to respective one of the vertical signal lines; an amplification section for amplifying an image signal; a clip section for clipping the vertical signal line so that it does not fall below a predetermined voltage in a read period for outputting the signal electric charges generated at the photoelectric conversion device onto the vertical signal line; and a control section for changing a clip level of the clip section in accordance with setting of an amplification factor at the amplification section.

13 Claims, 13 Drawing Sheets

SOLID-STATE IMAGING APPARATUS

This application claims benefit of Japanese Patent Application No. 2008-145583 filed in Japan on Jun. 3, 2008, the contents of which are incorporated by this reference.

BACKGROUND OF THE INVENTION

The present invention relates to solid-state imaging apparatus for use for example in a video camera or digital still camera, and more particularly relates to the solid-state imaging apparatus using amplified solid-state imaging device which has an amplification function within its imaging region.

In recent years, CMOS (Complementary Metal Oxide Semiconductor) type image sensors are drawing attention and are practically used as solid-state imaging device. MOS type image sensors, as compared to CCD (Charge Coupled Device) type image sensor, is capable of being driven by a single power supply, and MOS image sensors can be manufactured through an identical manufacturing process as other LSI's while CCD image sensors do require an exclusive manufacturing process. For this reason, the MOS image sensor can be readily formed into an SOC (System On Chip) so as to be imparted with a multiple of functions. Also, since the MOS image sensor has an amplification circuit in each pixel so as to amplify signal electric charge within pixel, it is less likely to be affected by noise that occurs due to transmission path of signal. Further, the MOS image sensor is capable of selectively extracting signal electric charge of each pixel, and in theory of arbitrarily controlling pixel by pixel an accumulation time of signal and/or the order according to which it is read out.

Figure 1:
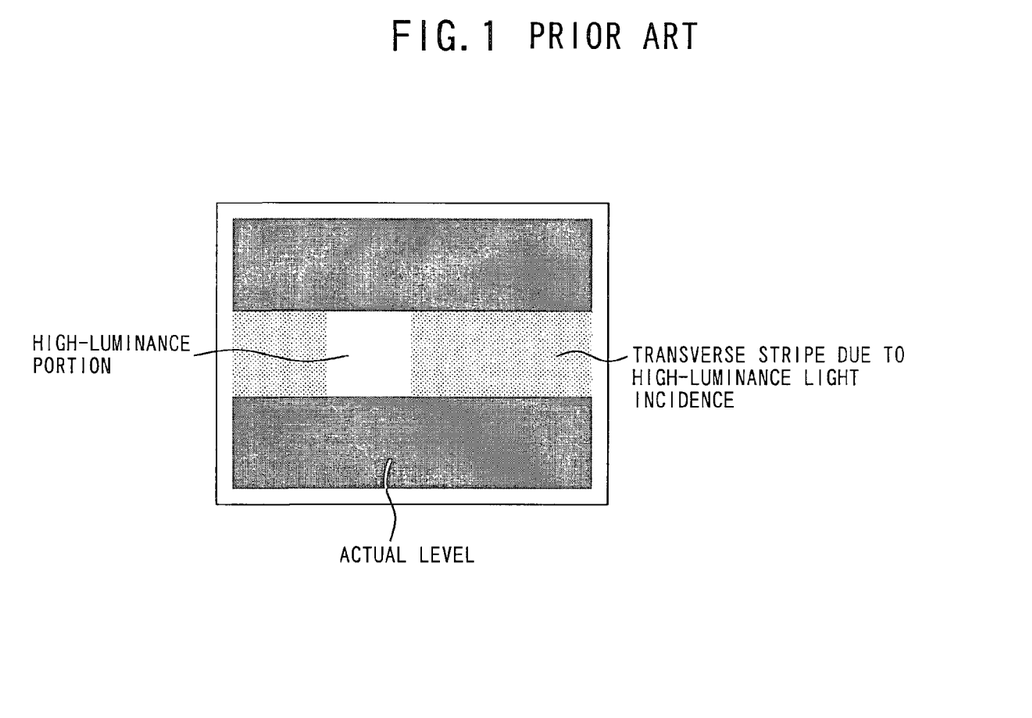
FIG. 1 schematically illustrates an image in the case where the transverse stripe phenomenon at the time of incidence of high-luminance light occurs.

Now, with the MOS image sensor, when a high-luminance light is incident, a change in potential occurs toward right and left of a region on which the high-luminance light is incident so that an image is obtained as if a white band-like light is incident. Such a phenomenon in the present specification will be referred to hereinafter as "transverse stripe phenomenon at the time of incidence of high-luminance light". FIG. 1 schematically illustrates an image when the transverse stripe phenomenon at the time of incidence of high-luminance light occurs. Shown in FIG. 1 is a case where a high-luminance light is incident in the vicinity of a center whereby a band-like transverse stripe due to change in potential is seen in the direction of its left and right. The transverse stripe phenomenon at the time of incidence of high-luminance light will be described below together with an operation of typical MOS image sensor.

Figure 2:
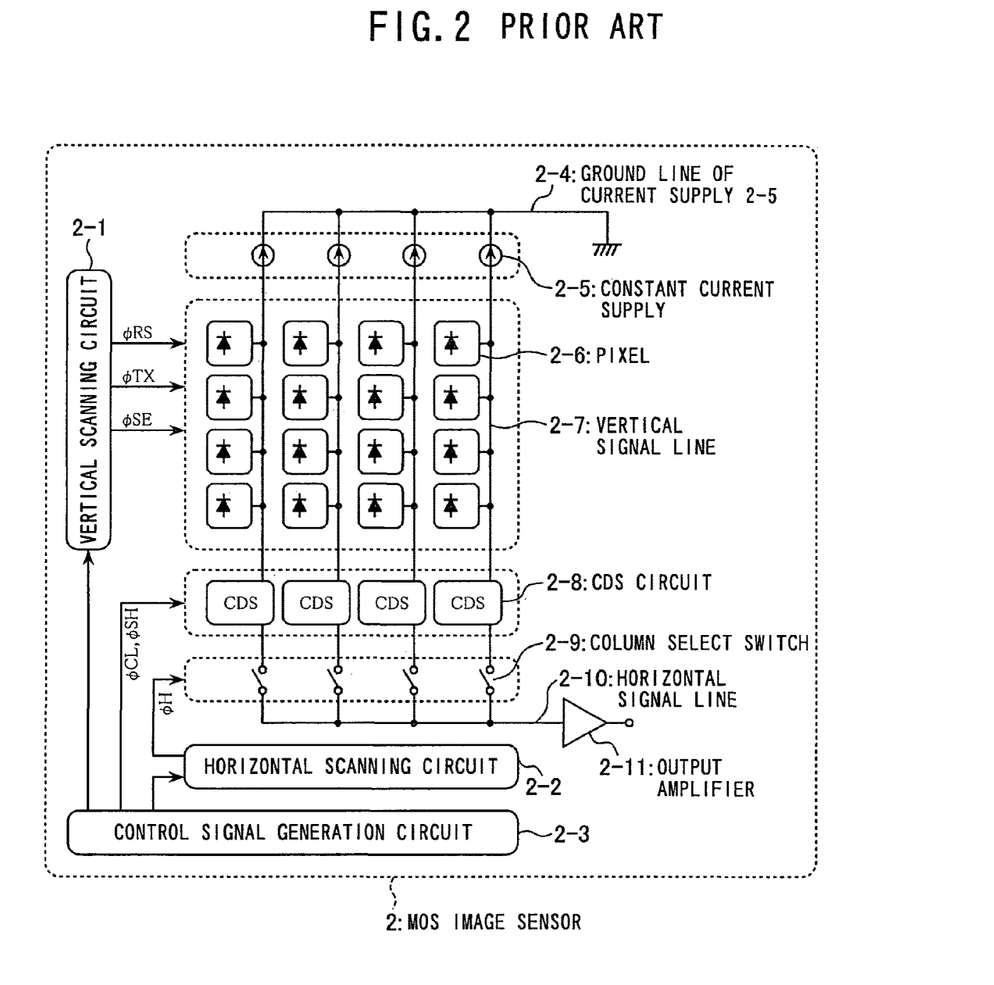
FIG. 2 is a block diagram showing a construction of a typical prior-art MOS image sensor.

FIG. 2 shows a block diagram of a typical MOS image sensor. For ease of explanation, the MOS image sensor 2 shown in FIG. 2 has a pixel section structure where pixels are arranged into 4 rows by 4 columns. Its construction is as follows. In particular, the MOS image sensor includes: constant current supplies 2-5 connected to a ground line 2-4; pixels 2-6 for converting light into electrical signals; and CDS circuits 2-8 connected through vertical signal lines 2-7 for removing noise components of pixels. The CDS circuits 2-8 are respectively connected to column select switches 2-9, and the column select switches 2-9 are further connected to an output amplifier 2-11 through a horizontal signal line 2-10. The pixels 2-6 are controlled by pixel reset pulse φRS, electric charge transfer pulse φTX, and pixel select pulse φSE that are generated from a vertical scanning circuit 2-1 upon receiving of signal from a control signal generation circuit 2-3; the column select switches 2-9 are controlled by column select pulse φH that is generated from a horizontal scanning circuit 2-2 similarly upon receiving of signal from the control signal generation circuit 2-3; and the CDS circuits 2-8 are controlled by clamp pulse φCL and sample-and-hold pulse φSH that are similarly generated from the control signal generation circuit 2-3.

Figure 3:
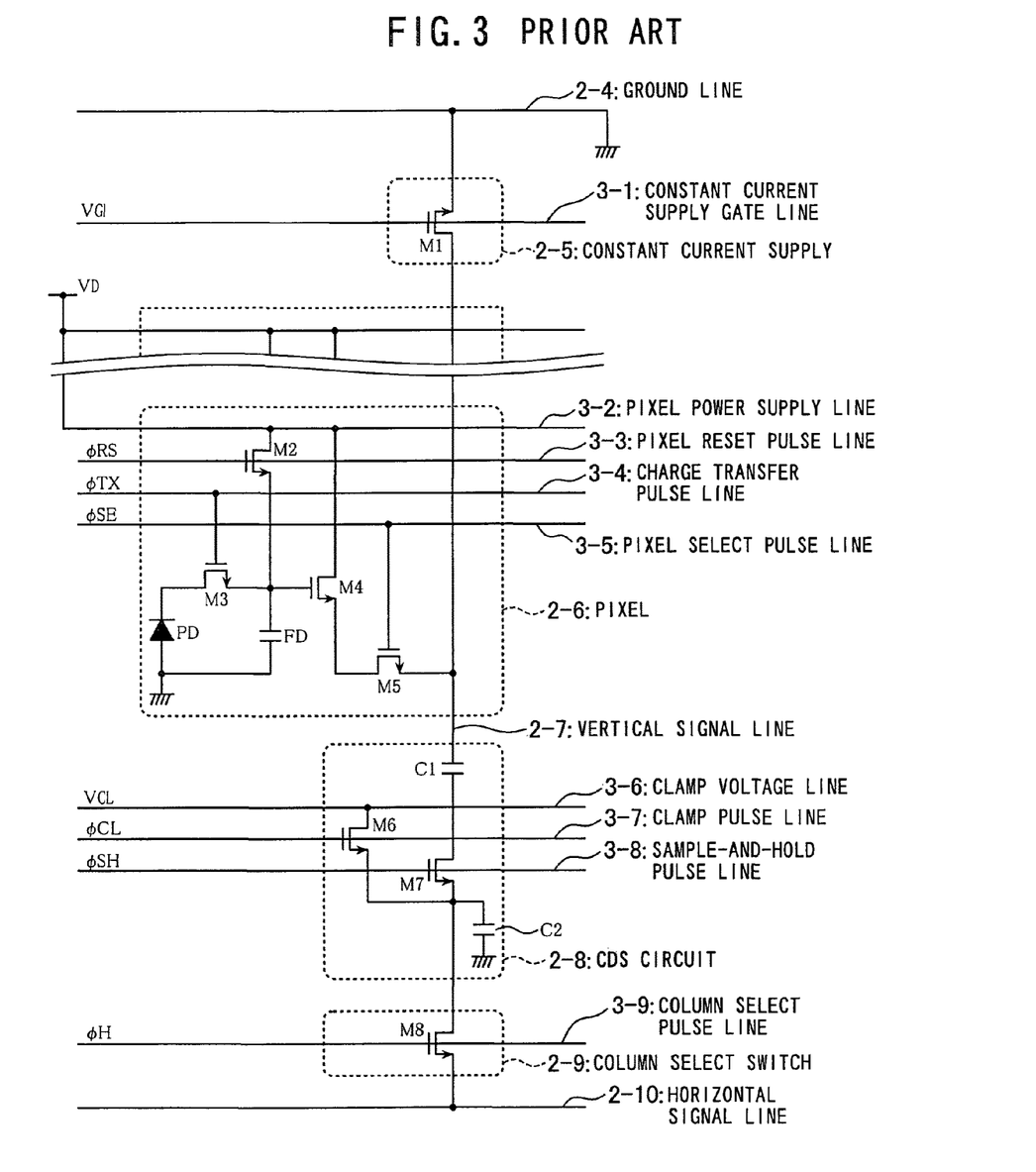
FIG. 3 is a circuit diagram showing a specific construction with noticing certain one column in the prior-art example shown in FIG. 2.

FIG. 3 shows a circuit construction of the MOS image sensor 2 with taking notice of certain one column in FIG. 2. Like components as in FIG. 2 are denoted by like symbols as in FIG. 2. The constant current supply 2-5 includes a constant current supply transistor M1 connected to a constant current supply gate line 3-1. The pixel 2-6 is to convert an irradiated light into an electrical signal and output it to the vertical signal line 2-7. The pixel 2-6 includes: a pixel reset transistor M2; a charge transfer transistor M3; an amplification transistor M4; a pixel select transistor M5; a photodiode PD; and a floating diffusion section FD. The transistors within the pixel 2-6 are respectively connected to a pixel power supply line 3-2 that is shared by all the pixels, and to a pixel reset pulse line 3-3, a charge transfer pulse line 3-4, and a pixel select pulse line 3-5 that are shared by the pixels arranged in row direction.

The CDS circuit 2-8 is to remove noise components that are different from one pixel to another, and includes: a clamp capacitor C1; a clamp transistor M6; a sample-and-hold capacitor C2; and a sample-and-hold transistor M7. The transistors within the CDS circuit 2-8 are respectively connected to a clamp voltage line 3-6, a clamp pulse line 3-7, and a sample-and-hold pulse line 3-8. The column select switch 2-9 includes a column select transistor M8 that is connected to a column select pulse line 3-9.

Figure 4:
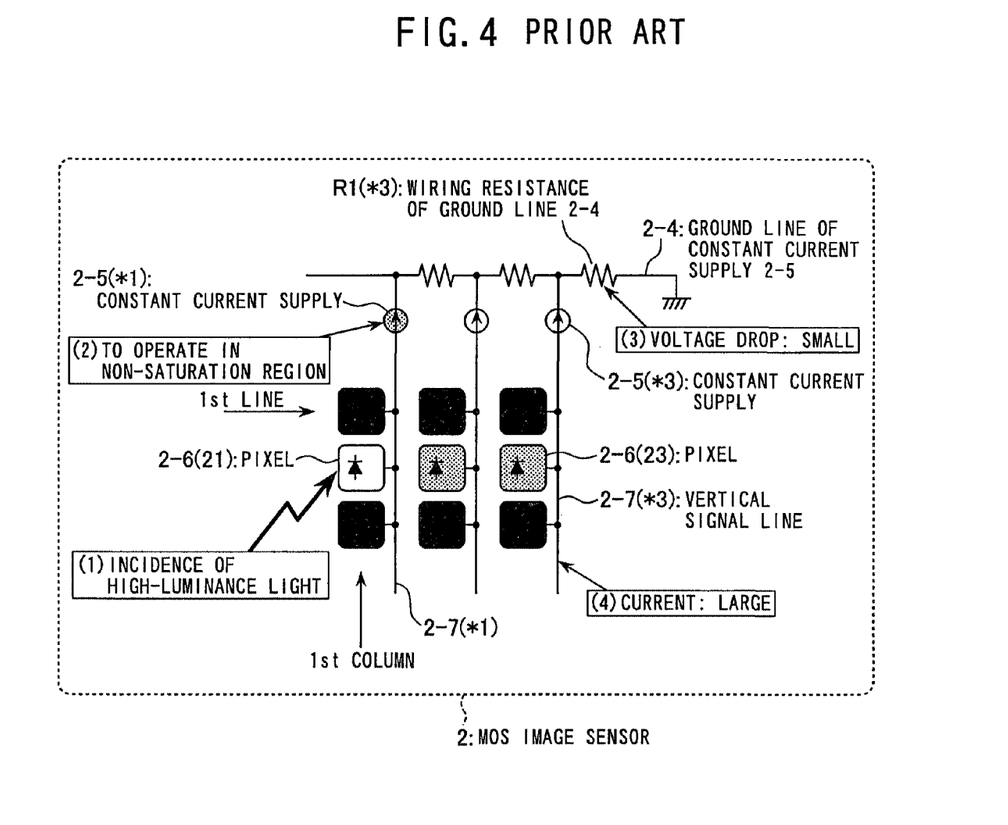
FIG. 4 is to explain an operation in the case where the transverse stripe phenomenon at the time of incidence of high-luminance light occurs in the prior-art example shown in FIG. 2.

FIG. 4 explains an operation in the case where high-luminance light is incident on a certain one pixel in thus constructed MOS image sensor so that the transverse stripe phenomenon at the time of incidence of high-luminance light occurs. FIG. 4 represents a portion of the MOS image sensor 2 shown in FIG. 2, where like components as in FIG. 2 are denoted by like reference symbols. For ease of explanation, the pixels in FIG. 4 are arranged in a two-dimensional lattice of 3 rows by 3 columns, where a pixel on the second row in the first column for example is denoted by 2-6(21). Further, a constant current supply for the first column for example is referred to as the constant current supply 2-5(*1).

A description will be given below of an operation mode of the pixel 2-6(23) on the second row in the third column when a high-luminance light is incident on the pixel 2-6(21) on the second row in the first column.

(1) As the high-luminance light is incident on the pixel 2-6(21) on the second row in the first column, the potential on the first column vertical signal line 2-7(*1) connected to the pixel 2-6(21) falls.

(2) The first column constant current supply 2-5(*1) operates in non-saturation region.

(3) A current value on the ground line 2-4 is lowered so that a voltage drop at a wiring resistance R1(*3) becomes smaller.

(4) A gate-source voltage of the constant current supply transistor within the third column constant current supply 2-5(*3) is increased so that an electric current greater than normal flows into the third column vertical signal line 2-7 (*3). As a result, the gate-source voltage of the amplification transistor within the pixel 2-6(23) on the second row in the third column is also increased so that a voltage lower than normal is outputted, i.e. brighter as an image. A similar phenomenon occurs of all the pixels in the row direction.

To deal with such transverse stripe phenomenon at the time of incidence of high-luminance light, methods as in the following have been proposed for example in Japanese Patent Application Laid-Open 2001-230974. Particularly in the proposal, a circuit for clipping a voltage on the vertical signal line for example is separately provided whereby the voltage on the vertical signal line is controlled so as not to OFF the transistor within the constant current supply in periods for reading a signal of an incident light.

By clipping the vertical signal line with providing a clip circuit on the vertical signal line so as not to cause to OFF the transistor within the constant current supply as in the above prior-art proposal, the transverse stripe phenomenon at the time of incidence of high-luminance light can be reduced.

SUMMARY OF THE INVENTION

In a first aspect of the invention, there is provided a solid-state imaging apparatus including: a pixel section having a plurality of pixels arranged into rows and columns each pixel containing at least a photoelectric conversion device for converting an incident light into signal electric charges, a transfer device for transferring the signal electric charges generated at the photoelectric conversion device, and an amplification device for amplifying the transferred signal electric charges; vertical signal lines provided in common for each column to read outputs of the pixels; constant current supplies respectively connected to the vertical signal lines; an amplification section for amplifying an image signal obtained from the pixels; a clip section for clipping the vertical signal line so that it does not fall below a predetermined voltage in a read period for outputting the signal electric charges generated at the photoelectric conversion device onto the vertical signal line; and a control section for changing a clip level of the clip section in accordance with setting of an amplification factor at the amplification section.

In a second aspect of the invention, the control section in the solid-state imaging apparatus according to the first aspect, when the amplification factor at the amplification section is set higher, sets a correspondingly higher clip level at the clip section.

In a third aspect of the invention, the solid-state imaging apparatus according to the first or second aspect takes a pixel in the pixel section from which a signal of the incident light is read out as a first pixel, wherein a pixel other than the first pixel is used as the clip section.

In a fourth aspect of the invention, the predetermined voltage on the vertical signal line in the solid-state imaging apparatus according to any one of the first to third aspects is a voltage with which the constant current supply does not enter a non-saturation region.

In a fifth aspect of the invention, the predetermined voltage on the vertical signal line in the solid-state imaging apparatus according to any one of the first to fourth aspects is a voltage with which a maximum value of a dynamic range of an image signal after amplification by the amplification section can be secured.

In a sixth aspect of the invention, the pixel used as the clip section in the solid-state imaging apparatus according to any one of the third to fifth aspects is a pixel in the vicinity of the first pixel.

In a seventh aspect of the invention, the pixel used as the clip section in the solid-state imaging apparatus according to any one of the third to sixth aspects is sequentially changed in a synchronized manner with a change of the pixel to be read.

DESCRIPTION OF THE PREFERRED EMBODIMENTS

Some embodiments of the solid-state imaging apparatus according to the invention will be described below with reference to the drawings.

(Embodiment 1)

Figure 5:
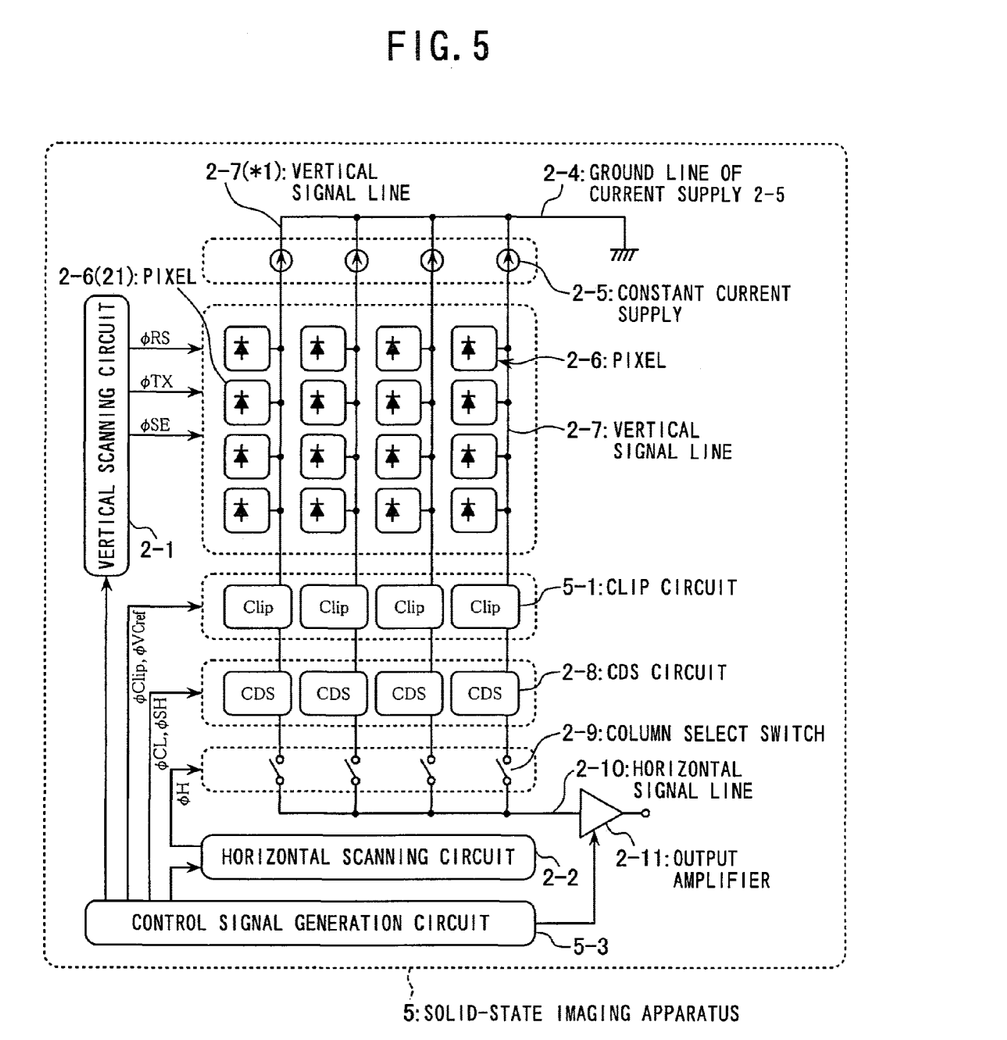
FIG. 5 is a block diagram showing a construction of a first embodiment of the solid-state imaging apparatus according to the invention.

A first embodiment will first be described. FIG. 5 is a block diagram of the MOS solid-state imaging apparatus according to the first embodiment. For ease of explanation, the first embodiment shown in FIG. 5 has a pixel section structure of pixels 2-6 arranged into 4 rows by 4 columns, where like components as in the prior-art MOS image sensor 2 shown in FIG. 2 are denoted by like reference symbols as in FIG. 2. It is different from the prior-art MOS image sensor shown in FIG. 2 in the operation of a control signal generation circuit 5-3 and in that a clip circuit 5-1 is added. The control signal generation circuit 5-3, in addition to the operation control of the prior-art example control signal generation circuit 2-3 shown in FIG. 2, is to send an instruction for setting an amplification factor at the output amplifier 2-11 to the output amplifier 2-11, and further to send an instruction corresponding to the set amplification factor of the output amplifier 2-11 to the clip circuit 5-1.

Figure 6:
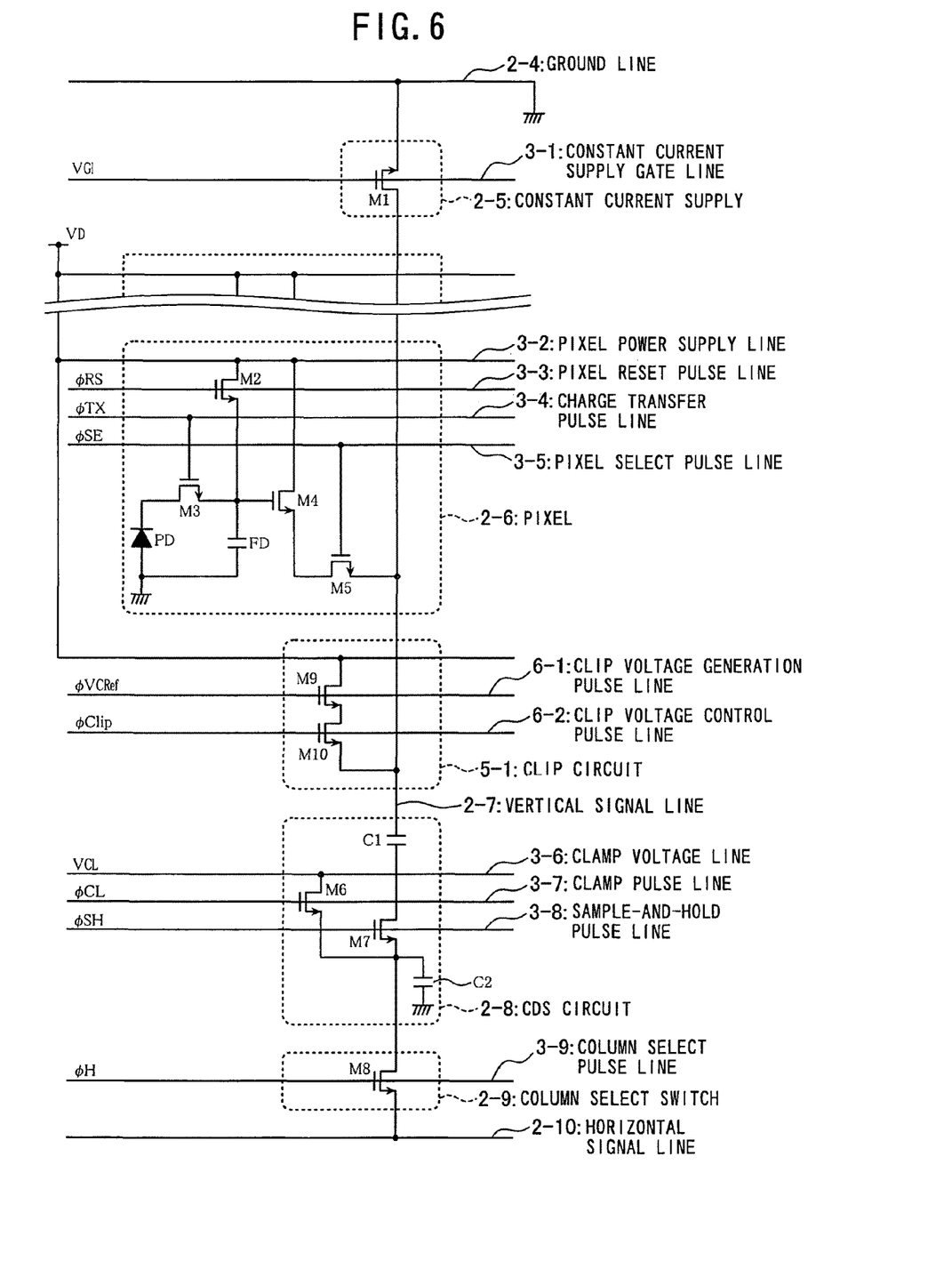
FIG. 6 is a circuit diagram showing a specific construction with noticing certain one column in the first embodiment shown in FIG. 5.

FIG. 6 shows a circuit construction with noticing a certain one column within the first embodiment shown in FIG. 5. Like components as in the prior-art example shown in FIG. 3 are denoted by like reference symbols as in FIG. 3. FIG. 6 is different from the prior-art example shown in FIG. 3 in that the clip circuit 5-1 is added. The clip circuit 5-1 is to clip the voltage on the vertical signal line 2-7 to a predetermined voltage when a clip voltage control pulse φClip is at High level. The clip circuit 5-1 includes a clip voltage generation transistor M9 and a clip voltage control transistor M10, and is connected to the pixel power supply line 3-2, a clip voltage generation pulse line 6-1, a clip voltage control pulse line 6-2, and the vertical signal line 2-7. Further, the clip voltage generation transistor M9 and the clip voltage control transistor M10 are respectively controlled by a clip voltage generation pulse φVCRef and the clip voltage control pulse φClip that are signals outputted from the control signal generation circuit 5-3.

Figure 7:
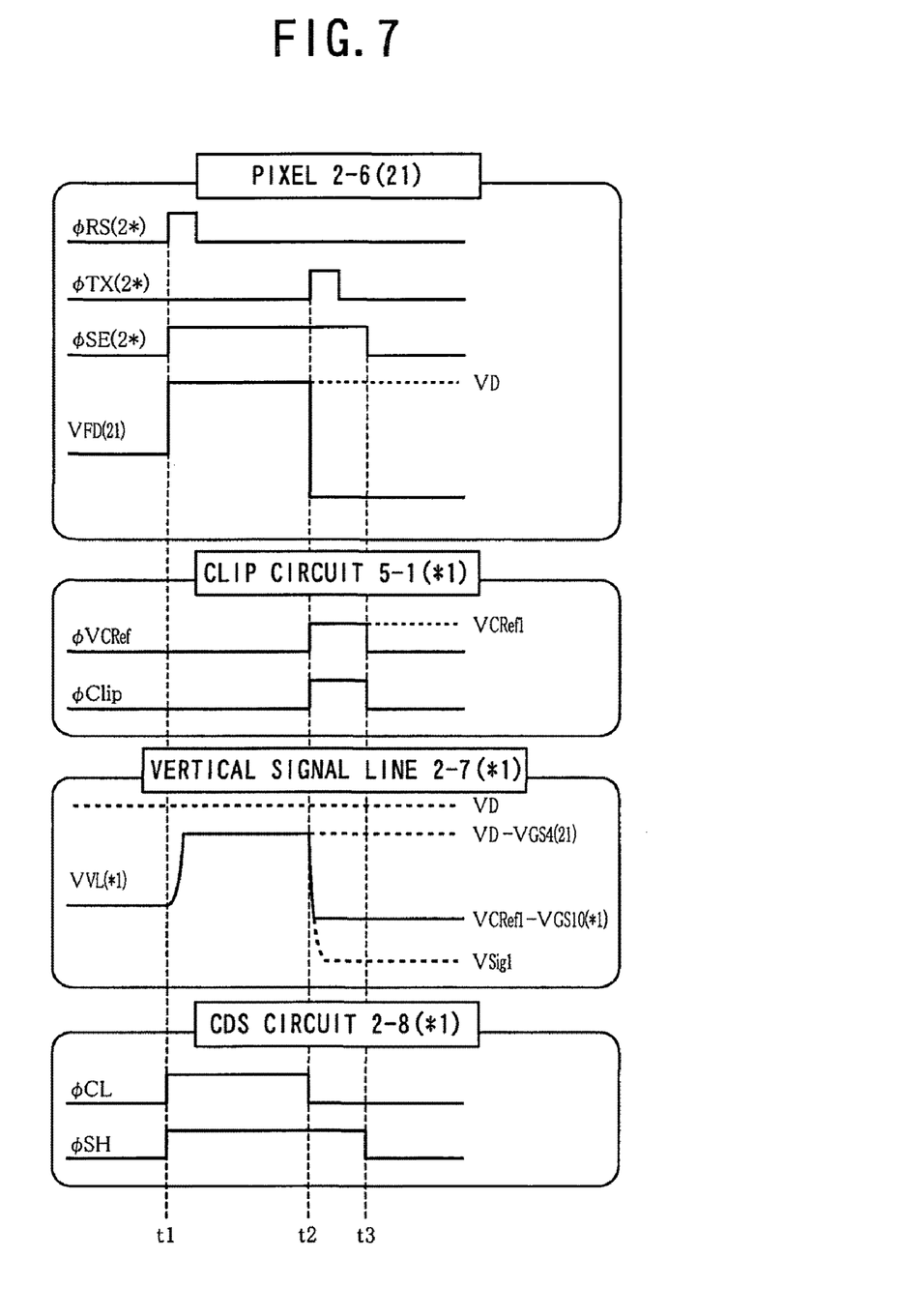
FIG. 7 is a timing chart for explaining an operation in the case where an amplification factor of output amplifier is 1 in the first embodiment.

FIG. 7 shows a timing chart for explaining an operation of the MOS image sensor 5 in the case where an image signal is not amplified at the output amplifier 2-11 (amplification factor being 1). It is to be noted that, of the solid-state imaging apparatus 5 according to the first embodiment shown in FIGS. 5 and 6, a pixel on the second row in the first column for example is indicated as pixel 2-6(21), and the first column constant current supply for example is indicated as constant current supply 2-5(*1). An operation mode will now be described by way of an example of the case where a high luminance light is incident on the pixel 2-6(21) on the second row in the first column. Referring to the timing chart shown in FIG. 7, VFD indicates a voltage of floating diffusion section FD and VVL a voltage on the vertical signal line 2-7. At time t1, the pixel reset pulse φRS(2*) of the second row attains High level whereby VFD(21) of the pixel on the second row in the first column is reset to a pixel power supply voltage VD of the pixel section. Further, assuming VGS4 as the gate-source voltage of the amplification transistor M4, the first column vertical signal line voltage VVL(*1) is reset to a level of [VD−φVGS4(21)].

Next, when the second row pixel transfer pulse φ TX(2*) attains High level at time t2 so that a signal corresponding to electric charges accumulated at PD(21) of the pixel on the second row in the first column is entirely transferred to the floating diffusion section FD(21), the first column vertical signal line voltage VVL(*1) falls to VSig. Since simultaneously at time t2, however, the clip voltage generation pulse φVCRef attains High level and the clip voltage control pulse φClip attains High level, the first column vertical signal line voltage VVL(*1) is clipped at [VCRef1−VGS10(*1)]. Here, VCRef1 is a voltage generated at the clip voltage generation transistor M9 by an application of the clip voltage generation pulse φVCRef when amplification factor is 1, and VGS10(*1) is a gate-source voltage of the clip voltage control transistor M10 of the first column clip circuit. At time t3, the sample-and-hold pulse φSH attains Low level whereby [VD−VGS4 (21)−{VCRef1−VGS10(*1)}] is outputted onto the horizontal signal line 2-10 as the image signal. Since the amplification factor in this case is 1, the image signal is outputted to the outside as it is through the output amplifier 2-11 without being amplified. The clip voltage [VCRef1−VGS10(*1)] in the case of 1 as the amplification factor is equivalent to a maximum value of the value to be subjected to image processing at a later stage with setting an amplification factor to 1, and at the same time is a voltage with which the first column constant current supply transistor M1(*1) does not enter a non-saturation region.

Figure 8:
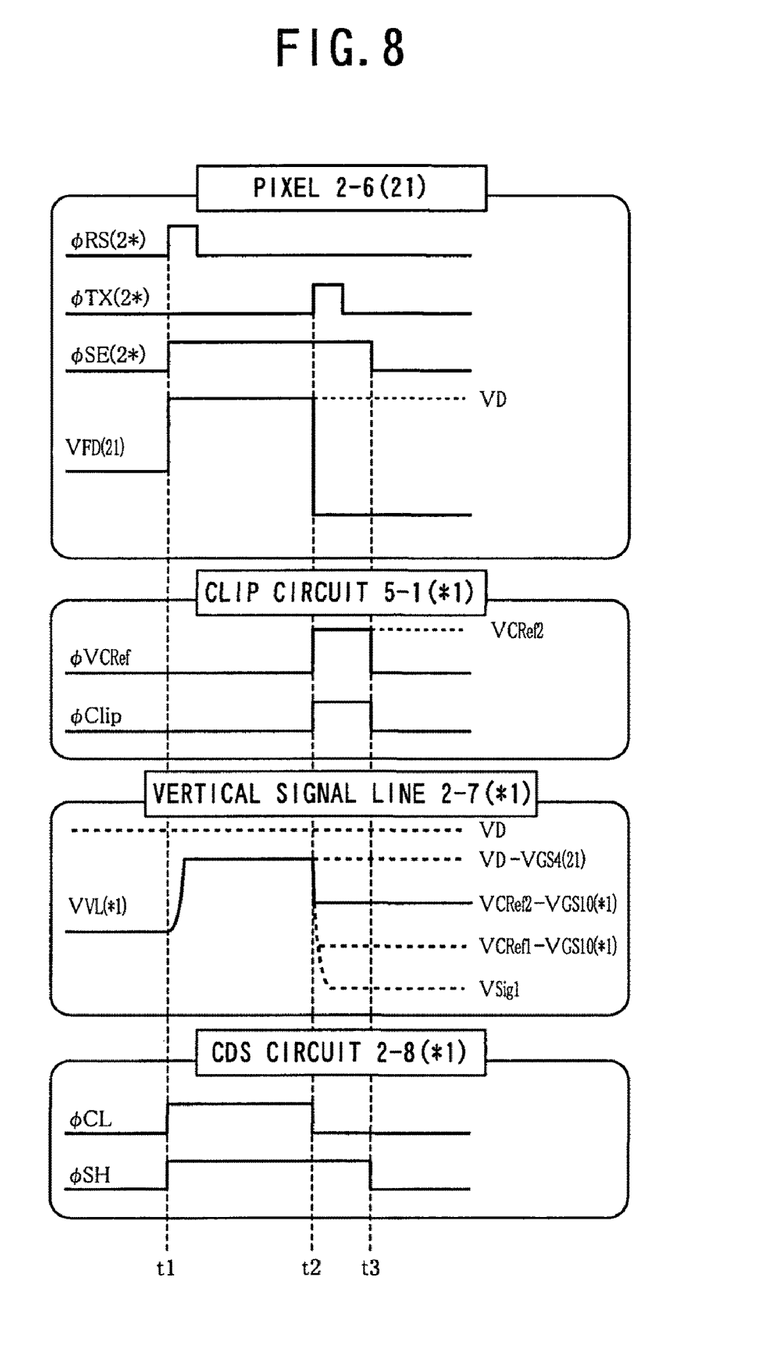
FIG. 8 is a timing chart for explaining an operation in the case where an amplification factor of output amplifier is 2 in the first embodiment.

Shown in FIG. 8 is a timing chart for explaining an operation of the solid-state imaging apparatus 5 according to the first embodiment in the case where the image signal is amplified at the output amplifier 2-11 (for example by an amplification factor of 2). Those portions identical to those in FIG. 7 are denoted by identical symbols as in FIG. 7. It is different from the operation shown in FIG. 7 only in that, when at time t2 the clip voltage generation pulse φVCRef is at High level and the clip voltage control pulse φClip at High level, the first column vertical signal line voltage VVL(*1) is clipped at [VCRef2−VGS10(*1)]. Here, φVCRef2 is a voltage generated at the clip voltage generation transistor M9 by an application of the clip voltage generation pulse φVCRef when amplification factor is 2, and it is a voltage at a level higher by one half or so than the clip voltage VCRef1 of the case where the amplification factor is 1. Accordingly at time t3, the sample-and-hold pulse φSH attains Low level whereby [VD−VGS4(21)−{VCRef2−VGS10(*1)}] is outputted onto the horizontal signal line 2-10 as the image signal.

Since the amplification factor in this case is 2, the image signal is outputted to the outside as it is amplified as multiplied by 2 through the output amplifier 2-11. The clip voltage [VCRef2−VGS10(*1)] in the case of 2 as the amplification factor is a value capable of securing a maximum value when image processing is effected at a later stage with setting 2 as the amplification factor, and at the same time is a voltage with which the constant current supply transistor M1(*1) does not enter a non-saturation region.

Figure 9:
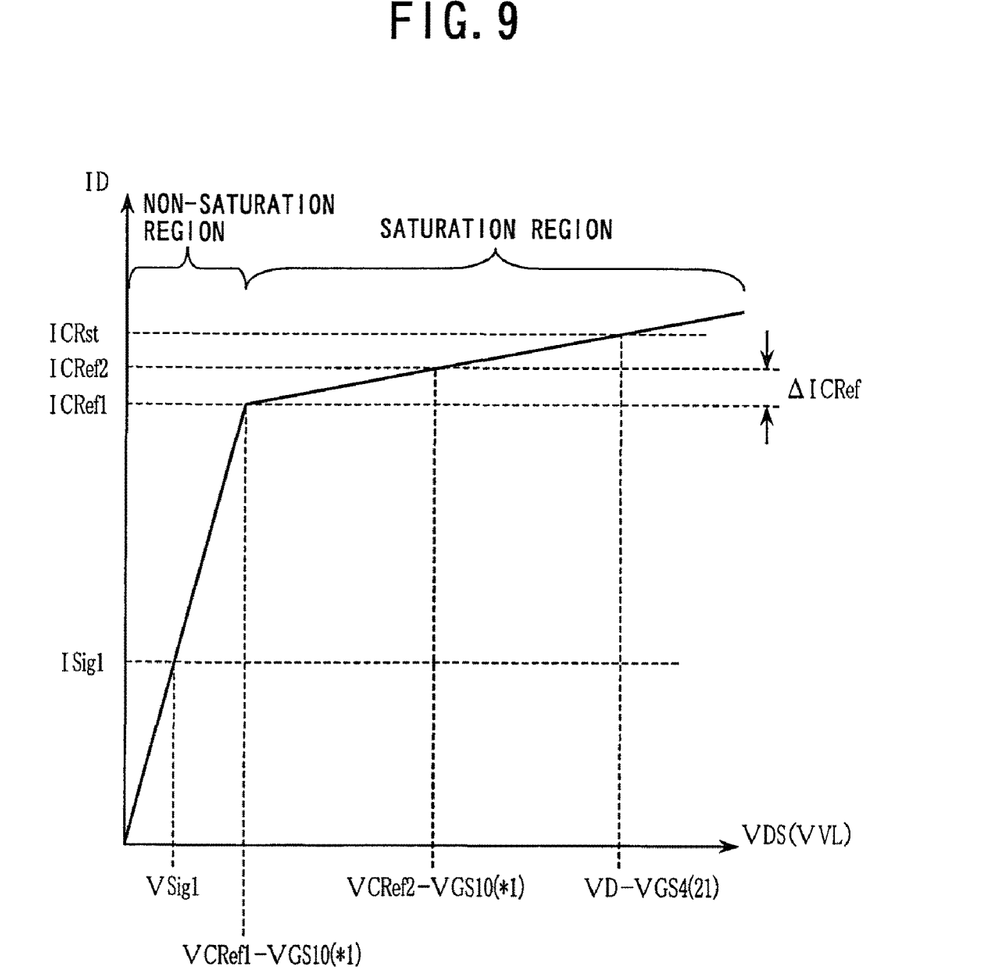
FIG. 9 shows a relationship between the drain-source voltage and the drain current of the constant current supply transistor to explain a clip voltage in the first embodiment.

FIG. 9 is to explain the clip voltage in detail, showing a characteristic between drain-source voltage VDS and drain current ID of the first column constant current supply transistor M1(*1). Referring to FIG. 9, VDS is equivalent to voltage VVL on the vertical signal line 2-7, and clip voltages [VCRef1−VGS10(*1)], [VCRef2−VGS10(*1)] do correspond to VDS. Further, since the transverse stripe phenomenon at the time of incidence of high-luminance light becomes evident as the drain current ID of the constant current supply transistor M1 decreases, it depends on the value of the drain current ID in FIG. 9. In particular, an occurrence of the transverse stripe phenomenon at the time of high-luminance incidence becomes more conspicuous with a decrease in the value of the drain current ID. ICRst is an electric current at the time of pixel reset, i.e. in the case where the vertical signal line voltage VVL is (VD−VGS4). As shown in FIG. 9, at level where VDS enters non-saturation region, i.e. Vsig1 (vertical signal line voltage when the high-luminance light is incident) shown in FIGS. 7, 8, since the drain current ID inevitably falls to ISig1 (drain current of the constant current supply transistor when high-luminance light is incident), the vertical signal line voltage is clipped at the level of [VCRef1−VGS10(*1)] so as to reduce the transverse stripe phenomenon at the time of high-luminance incidence.

Since image signal is amplified to be doubled at the output amplifier when the amplification factor is 2, an image signal identical to the case of 1 as the amplification factor is obtained at the end even though the vertical signal line voltage VVL or the value of the drain-source voltage of the constant current supply transistor M1 is half that of the case of 1 as the amplification factor.

When seen from [VD−VGS4(21)] in FIG. 9, it is understood that change in the drain current ID of the constant current supply transistor M1 is smaller for the clip voltage [VCRef2−VGS10(*1)] in the case of setting 2 as the amplification factor. Accordingly, by changing clip voltage following a setting of the amplification factor, it is seen as shown in FIG. 9 that the transverse stripe phenomenon at the time of high-luminance incidence due to drain current difference ΔICRef of the constant current transistor M1 within the saturation region can be efficiently reduced.

(Embodiment 2)

Figure 10:
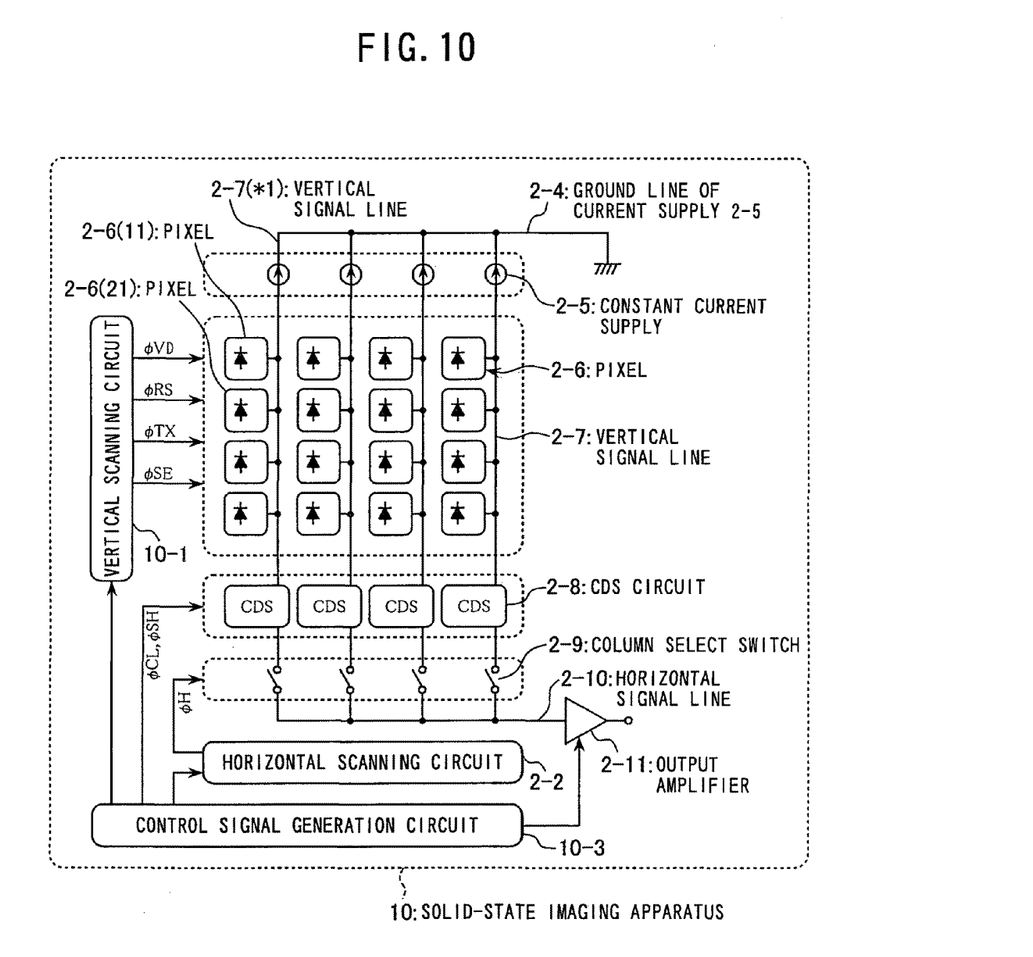
FIG. 10 is a block diagram showing a construction of the solid-state imaging apparatus according to a second embodiment.

A second embodiment will now be described. FIG. 10 is a block diagram showing construction of solid-state imaging apparatus 10 according to the second embodiment. For ease of explanation, the MOS solid-state imaging apparatus 10 according to the second embodiment shown in FIG. 10 has a pixel section structure in 4 rows by 4 columns, where like components as in the prior-art MOS image sensor 2 shown in FIG. 2 are denoted by like reference symbols as in FIG. 2. It is different from the prior-art example shown in FIG. 2 in the construction of a control signal generation circuit 10-3 and a vertical scanning circuit 10-1. The control signal generation circuit 10-3, in addition to operation of the prior-art example control signal generation circuit 2-3 shown in FIG. 2, is adapted to send an instruction for setting an amplification factor at the output amplifier 2-11 to the output amplifier 2-11, and further to send an instruction corresponding to the set amplification factor to the vertical scanning circuit 10-1.

Further, the vertical scanning circuit 10-1, in addition to the operation of the prior-art example vertical scanning circuit 2-1 shown in FIG. 2, is adapted to generate a power supply voltage VD corresponding to the amplification factor to the pixels 2-6 upon receiving of signal from the control signal generation circuit 10-3; it is made capable of outputting the power supply voltage VD as an independent value that is different from one row to another.

Figure 11:
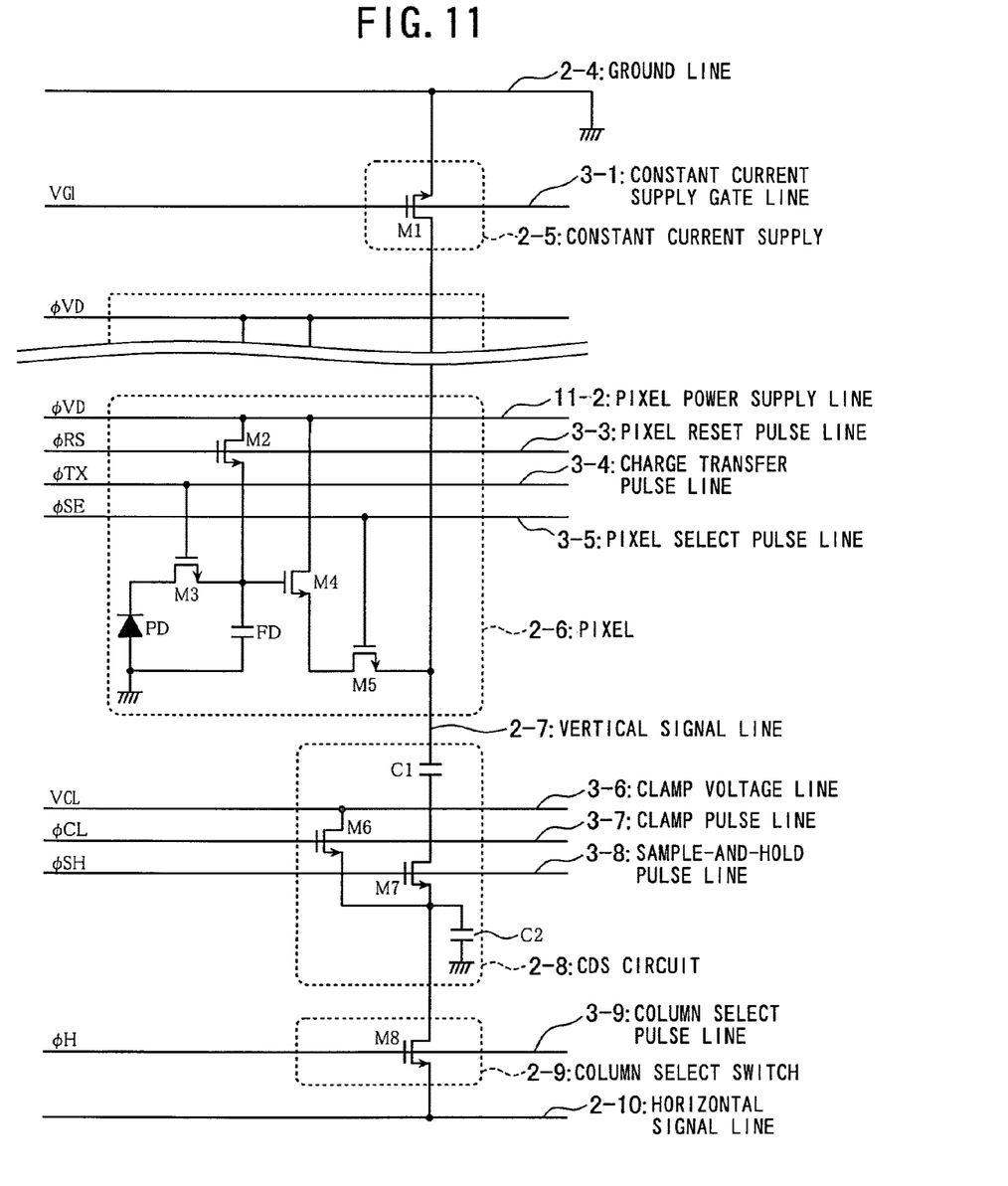
FIG. 11 is a circuit diagram showing a specific construction with noticing certain one column in the second embodiment shown in FIG. 10.

FIG. 11 shows a circuit construction with noticing a certain one column in the solid-state imaging apparatus according to the second embodiment shown in FIG. 10. Like components as in the prior-art example shown in FIG. 3 are denoted by like reference symbols as in FIG. 3. Referring to FIG. 11, it is different from the prior-art example shown in FIG. 3 in a pixel power supply line 11-2. While the pixel power supply line 3-2 in the prior-art example shown in FIG. 3 is a shared power supply line that is connected to all the pixels, the pixel power supply line 11-2 in the present embodiment is a row-by-row independent power supply line; it is made capable of applying voltages different from one row to another upon receiving of an instruction from the vertical scanning circuit 10-1.

Figure 12:
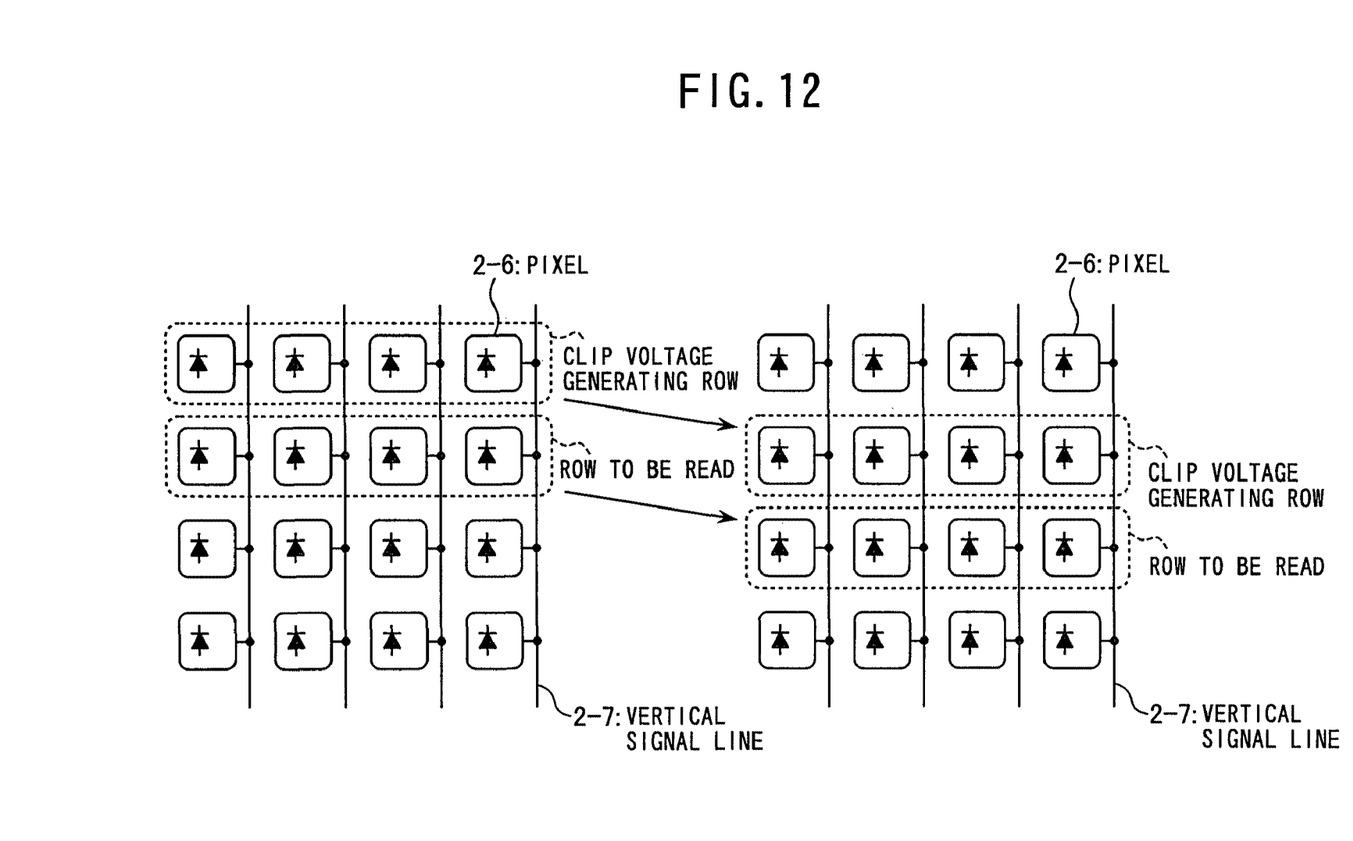
FIG. 12 is to explain a method of generating a clip voltage in the second embodiment.

FIG. 12 schematically illustrates a method of generating clip voltage in the second embodiment. In the second embodiment, the clip voltage is generated with using a pixel other than the pixel to be read out. A mode is shown in the example of FIG. 12 where the clip voltage generating pixels are also moved with the moving of the pixels to be read out. In the example shown in FIG. 12, with the exception of the first row, a pixel row after being read out is used to generate the clip voltage.

Figure 13:
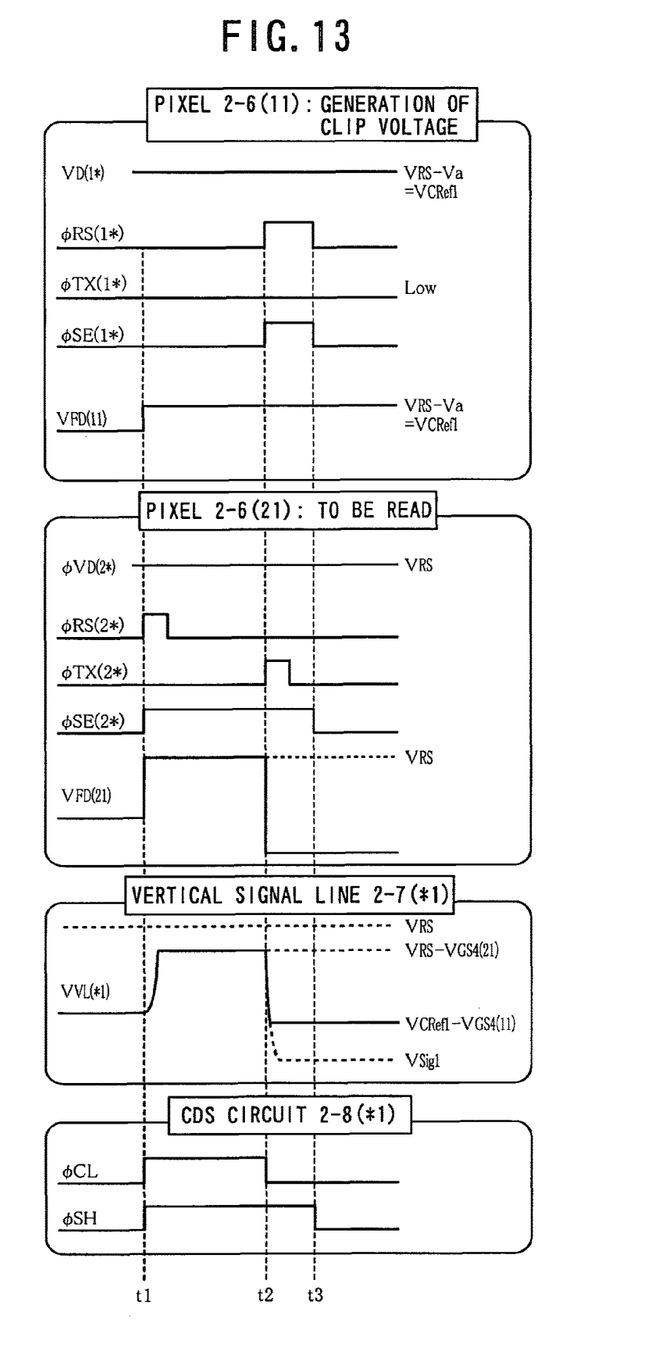
FIG. 13 is a timing chart for explaining an operation in the case where an amplification factor of output amplifier is 1 in the second embodiment.

FIG. 13 shows a timing chart for explaining operation of the solid-state imaging apparatus 10 according to the second embodiment in the case where the image signal is not amplified (amplification factor being 1) at the output amplifier 2-11. Those identical portions as in the first embodiment shown in FIG. 7 are denoted by identical symbols as in FIG. 7. It is different from the first embodiment shown in FIG. 7 in that a pixel other than the pixel to be read out is used to generate a clip voltage VCRef. A description will be given below with referring a pixel where clip voltage is generated to as clip voltage generating pixel; the pixel 2-6(11) on the first row in the first column is supposed as a clip voltage generating pixel and the pixel 2-6(21) on the second row in the first column as the pixel to be read out. At time t1 in FIG. 13, the second row pixel reset pulse φRS(2*) attains High level so that the floating diffusion section voltage VFD(21) on the second row in the first column is reset to a reset voltage VRS. Further, assuming VGS4 as the gate-source voltage of the amplification transistor M4, the first column vertical signal line voltage VVL(*1) is reset to a level of [VRS−VGS4(21)].

Next, when the second row charge transfer pulseφTX(2*) attains High level at time t2 so that a signal corresponding to electric charges accumulated at the photo diode PD(21) of the pixel on the second row in the first column is entirely transferred to the floating diffusion section FD(21), the first column vertical signal line voltage VVL(*1) falls to VSig (vertical signal line voltage at the time of the incidence of high luminance light). At the same time at time t2, however, since the pixel power supply voltage VD(1*) at the clip voltage generating pixel attains VCRef1=VRS−Va (Va being a constant) and since the pixel reset pulse φRS(1*) attains High level and the charge transfer pulse φTX(1*) Low level, the voltage VFD(11) at the floating diffusion section attains VCRef1. The vertical signal line VVL(*1) is thereby clipped to [VCRef1−VGS4(11)]. At time t3, the sample-and-hold pulse φSH attains Low level so that [VD−VGS4(21)−{VCRef1−VGS4(11)}] is outputted onto the horizontal signal line 2-10 as the image signal. The method of setting the clip voltage is similar to the first embodiment. Further in the case of the second embodiment, by using a pixel located near to the pixel to be read out as the clip generating pixel, VGS4(21)≈VGS4(11) can be assumed in the manufacturing process so as to also reduce a variance in the gate-source voltage VGS4 of the amplification transistor.

While a description has been given in the first and second embodiments with respect to a pixel section having pixels arranged into 4 rows by 4 columns, the number of rows and/or columns may be changed as required. The amplification factor at the output amplifier may also be changed at will. Further, while one where output of the horizontal signal line is amplified with an output amplifier is shown in each embodiment, similar methods of any types for example where output of the vertical signal line is amplified with a column amplifier provided for each column or where output of an output amplifier is AD-converted and its digital output is amplified may be used as far as it is a means for amplifying the output.

According to the present invention as has been described by way of the above embodiments, since a clip level of a clip means is changed in accordance with setting of the amplification factor at the amplification section for amplifying the image signal, it is possible to achieve a solid-state imaging apparatus in which the transverse stripe phenomenon at the time of incidence of high-luminance light can be effectively suppressed even with an image sensor having many pixels and/or when taking image at high sensitivity.

What is claimed is:
1. A solid-state imaging apparatus comprising:
a pixel section having a plurality of pixels arranged into rows and columns each pixel containing at least a photoelectric conversion device for converting an incident light into signal electric charges, a transfer device for transferring said signal electric charges generated at said photoelectric conversion device, and an amplification device for amplifying said transferred signal electric charges;
vertical signal lines provided in common for each column to read outputs of said pixels;
constant current supplies each connected to respective one of said vertical signal lines;
an amplification section for amplifying an image signal obtained from said pixels via a horizontal signal line connected to an input of said amplification section;
a clip section for clipping a voltage on said vertical signal line so that said voltage on said vertical signal line does not fall below a predetermined voltage in a read period for outputting said signal electric charges generated at said photoelectric conversion device onto said vertical signal line; and
a control section for setting of an amplification factor at said amplification section and changing a clip level at said clip section based on said amplification factor set at said amplification section connected to said horizontal signal line.

2. The solid-state imaging apparatus according to claim 1, wherein when the amplification factor at said amplification section is set higher by said control section, said control section, based on the higher amplification factor, correspondingly sets the clip level at the clip section to a higher clip level.

3. The solid-state imaging apparatus according to claim 1 taking a pixel in said pixel section from which a signal of said incident light is read out as a first pixel, wherein a pixel other than said first pixel is used as said clip section.

4. The solid-state imaging apparatus according to claim 2 taking a pixel in said pixel section from which a signal of said incident light is read out as a first pixel, wherein a pixel other than said first pixel is used as said clip section.

5. The solid-state imaging apparatus according to claim 1, wherein the predetermined voltage on said vertical signal line is a voltage with which said constant current supply does not enter a non-saturation region.

6. The solid-state imaging apparatus according to claim 2, wherein the predetermined voltage on said vertical signal line is a voltage with which said constant current supply does not enter a non-saturation region.

7. The solid-state imaging apparatus according to claim 3, wherein the predetermined voltage on said vertical signal line is a voltage with which said constant current supply does not enter a non-saturation region.

8. The solid-state imaging apparatus according to claim 4, wherein the predetermined voltage on said vertical signal line is a voltage with which said constant current supply does not enter a non-saturation region.

9. The solid-state imaging apparatus according to claim 1, wherein the predetermined voltage on said vertical signal line is a voltage that secures a maximum value of a dynamic range of an image signal after amplification by said amplification section.

10. The solid-state imaging apparatus according to claim 2, wherein the predetermined voltage on said vertical signal line is a voltage with which a maximum value of a dynamic range of an image signal after amplification by said amplification section can be secured.

11. The solid-state imaging apparatus according to claim 3, wherein the pixel used as said clip section is a pixel in the vicinity of said first pixel.

12. The solid-state imaging apparatus according to claim 4, wherein the pixel used as said clip section is a pixel in the vicinity of said first pixel.

13. The solid-state imaging apparatus according to any one of claim 3, 4, 7, 8, 11 or 12, wherein the pixel used as said clip section is sequentially changed in a synchronized manner with a change of said pixel to be read.

* * * * *